United States Patent
Klinghult

(10) Patent No.: US 8,120,588 B2
(45) Date of Patent: Feb. 21, 2012

(54) SENSOR ASSEMBLY AND DISPLAY INCLUDING A SENSOR ASSEMBLY

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 426 days.

(21) Appl. No.: 12/503,293

(22) Filed: Jul. 15, 2009

(65) Prior Publication Data

US 2011/0011650 A1 Jan. 20, 2011

(51) Int. Cl.
*G09G 5/00* (2006.01)
(52) U.S. Cl. ......... 345/173; 345/156; 345/168; 345/169
(58) Field of Classification Search .......... 345/156, 345/168–173
See application file for complete search history.

(56) References Cited

U.S. PATENT DOCUMENTS

| | | | |
|---|---|---|---|
| 6,369,803 B2 * | 4/2002 | Brisebois et al. | 345/173 |
| 6,857,800 B2 * | 2/2005 | Zhang et al. | 400/473 |
| 6,943,705 B1 * | 9/2005 | Bolender et al. | 341/33 |
| 7,064,561 B2 * | 6/2006 | Morimoto | 324/691 |
| 7,255,011 B2 * | 8/2007 | Morimoto | 73/781 |
| 7,825,911 B2 * | 11/2010 | Sano et al. | 345/173 |
| 2001/0043189 A1 | 11/2001 | Brisebois et al. | |
| 2005/0052425 A1 * | 3/2005 | Zadesky et al. | 345/173 |
| 2008/0018613 A1 | 1/2008 | Kim et al. | |
| 2009/0140996 A1 * | 6/2009 | Takashima et al. | 345/173 |

FOREIGN PATENT DOCUMENTS

| | | |
|---|---|---|
| EP | 1 351 121 A2 | 8/2003 |
| EP | 1 816 662 A2 | 8/2007 |

OTHER PUBLICATIONS

2008 Tech Forum, *Evolution of Technology & Creating New Businesses—Samsung LCD Business-*, Dec. 8, 2008, Jun H. Souk, Executive VP Samsung Electronics; http://www.samsung.com/sec/aboutsamsung/file/ir/irevent/analystday/2008/tech_forum_2008_004.pdf.
Bonnie C. Baker, Wendy Fang, "*Powering resistive touch screens efficiently*", Planet Analog, May 28, 2007 (3:16 PM), URL:http://www.planetanalog.com/showArticle?articleID=199702778.
International Search Report, corresponding to PCT/EP2010/050005, mailed on Mar. 31, 2010.
Written Opinion, corresponding to PCT/EP2010/050005, mailed on Mar. 31, 2010.

* cited by examiner

*Primary Examiner* — Duc Dinh
(74) *Attorney, Agent, or Firm* — Renner, Otto, Boisselle & Sklar, LLP

(57) ABSTRACT

A sensor assembly includes a coordinate input surface and, under a region thereof, a first and second switch assembly. Each assembly includes at least a first and second conductive element. When a force smaller than a first threshold is exerted on the surface, the first and second element of both assemblies are not in contact with each other. When a force larger than the first threshold and smaller than a second threshold is exerted, the first and second elements of the first assembly are in contact with each other, while the elements of the second assembly are not. When a force larger than the second threshold is exerted on the region, the elements of both assemblies are in contact with each other. A display including a sensor assembly is also disclosed.

8 Claims, 8 Drawing Sheets

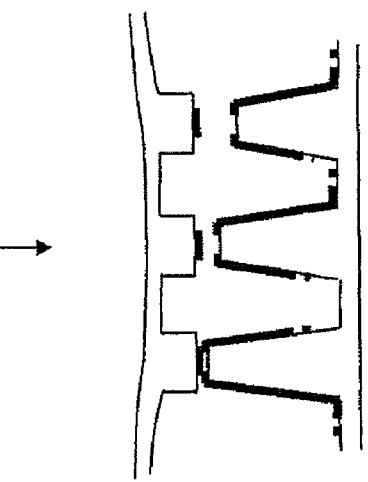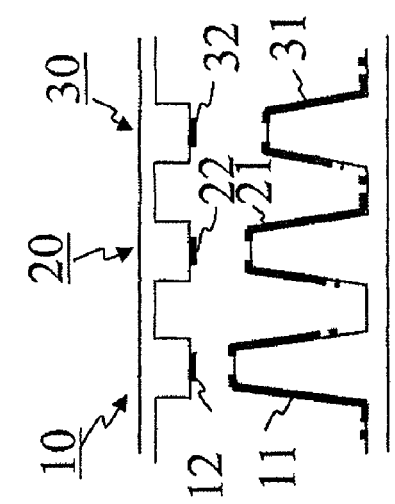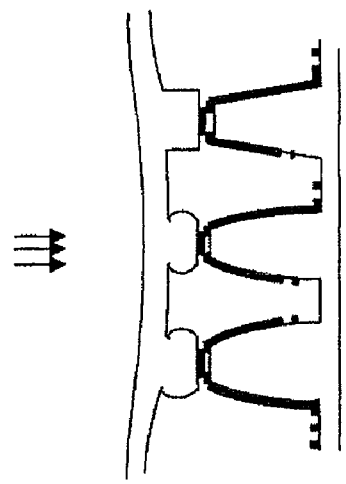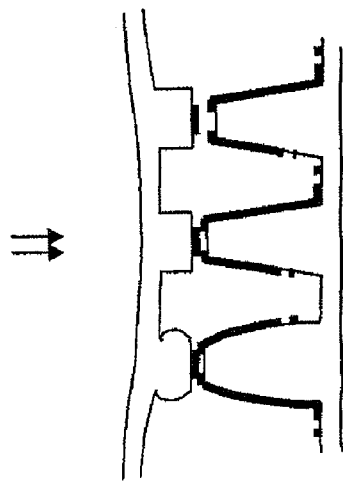
Fig. 7a
Fig. 7b
Fig. 7c
Fig. 7d

SENSOR ASSEMBLY AND DISPLAY INCLUDING A SENSOR ASSEMBLY

TECHNICAL FIELD

The present invention relates to sensor assemblies including a coordinate input surface, displays including such sensor assemblies, and mobile terminals including such displays. The sensor assemblies may be used in user interfaces and man-machine interfaces for controlling various devices, such as for instance, but not only, mobile terminals.

BACKGROUND

The use of touch sensors is known in the art for controlling devices through a user interface or man-machine interface. A panel provided with multiple touch sensors distributed under the surface of the panel may constitute a coordinate input surface. That is, the coordinate of the position of a finger, stylus or other object on the surface may be estimated and used as an input to control a device. For instance, electronic apparatuses with touch screens enable users to conveniently select targets, such as web links, with an object such as a finger placed on, i.e. touching, an outer surface above the display.

Touch sensors may for instance work by reacting to the capacitance introduced by a user's finger, or to a change in capacitance caused by the presence of a user's finger.

The detection of touch on a display, or more generally the detection of touch on a coordinate input surface, may also be achieved by other means. One of such means consists in configuring the touch panel such that, if a user touches a particular point of the touch panel, two conductive elements arranged under the outer surface are caused to come into contact with each other so as to be electrically connected. The position on the outer surface that the user has touched may therefore be determined.

For instance, patent application US 2008/0018613 A1 relates to a touch screen display apparatus including such a mechanism for detecting an external pressure. Referring to FIG. 3 and paragraphs [0048] and [0053] of US 2008/0018613 A1 (and using the reference numerals used therein), a first electrode pad 84 is connected to a sensor conductor 24 through a contact hole 71. A second electrode 86 is connected to a data line 62 through a contact hole 73.

When no external pressure is applied on the outer surface (that is, on layer 110 in FIG. 3 of US 2008/0018613 A1), the first electrode pad 84 is not electrically connected to the second electrode 86. In contrast, when external pressure is applied, a sensor electrode 142 comes into contact with both the first electrode pad 84 and the second electrode pad 86. The sensor conductor 24 and the data line 62 are therefore electrically connected together through the sensor electrode 142 at the point where the pressure is applied. Controlling means are provided to detect the electric connection and to recognize the position where the external pressure is applied.

FIGS. 4, 7 and 8 of US 2008/0018613 A1 show some variant configurations of such mechanism.

It is desirable to provide improved sensor assemblies and displays to notably allow finer interactions in the operation of user interfaces. It is also desirable to meet this goal without unduly increasing the complexity and cost of the sensor assemblies and displays.

SUMMARY

In order to meet, or at least partially meet, this goal, such a sensor assembly is defined in the independent claim. Advantageous embodiments of the sensor assembly are defined in the dependent claims. A display including the sensor assembly and a mobile terminal including the display are also defined in the dependent claims.

In one embodiment, the sensor assembly includes a coordinate input surface and, under a region of the coordinate input surface, at least a first switch assembly and a second switch assembly. Each one of the first switch assembly and the second switch assembly includes at least a first conductive element and a second conductive element. The second conductive element is movable relative to the first conductive element. The first and second switch assemblies and their respective first and second conductive elements are arranged, i.e. are configured, so that:

(i) when no force is exerted on the region of the coordinate input surface or when a force smaller than a first threshold force is exerted thereon, the first and second conductive elements of the first switch assembly are not in contact with each other and the first and second conductive elements of the second switch assembly are not in contact with each other;

(ii) when a force larger than the first threshold force and smaller than a second threshold force is exerted on the region of the coordinate input surface, the first and second conductive elements of the first switch assembly are in contact with each other and the first and second conductive elements of the second switch assembly are not in contact with each other; and (iii) when a force larger than the second threshold force is exerted on the region of the coordinate input surface, the first and second conductive elements of the first switch assembly are in contact with each other and the first and second conductive elements of the second switch assembly are also in contact with each other.

A coordinate input surface is herein defined as a surface which is suitable to be used in such a manner that a finger, stylus or other object can be placed on the surface and the position of the finger, stylus or other object on the surface is intended to be used as input for the operation or control of a device.

With such a configuration, a force exerted by a user's finger, hand, stylus or other object on the region of the outer surface above the switching assemblies can be detected and estimated by monitoring how many contacts are formed. This enables finer interactions in the operation of user interfaces, because the pressure applied by the user's finger, hand, stylus or other object can be used as a parameter in the user interaction process.

As mentioned above, at least a first switch assembly and a second switch assembly are arranged under a region of the coordinate input surface. The first and second switch assemblies together form a force sensor assembly. A plurality of force sensor assemblies including the switch assemblies may be formed under the coordinate input surface so that the position (x, y coordinates) and the force exerted on the coordinate input surface which corresponds or may be mapped to a displacement (z coordinate), may be detected for the whole coordinate input surface.

Two switch assemblies as described above enable to detect three ranges of forces: (i) $f<f_1$; (ii) $f_1 \leq f<f_2$; and (iii) $f \geq f_2$. Arranging more than two switch assemblies is also contemplated within the scope of the invention. For instance, six switch assemblies enable to detect seven ranges of forces: (i) $f<f_1$; (ii) $f_1 \leq f<f_2$; (iii) $f_2 \leq f<f_3$; (iv) $f_3 \leq f<f_4$; (v) $f_4 \leq f<f_5$; (vi) $f_5 \leq f<f_6$; and (vii) $f \geq f_6$; wherein each threshold $f_1, f_2, f_3, f_4, f_5, f_6$ corresponds to the electric contact of one switch assembly being made.

In one embodiment, the sensor assembly is such that the coordinate input surface is the surface of a touch screen.

In one embodiment, the sensor assembly is such that the second conductive element of the first switch assembly and the second conductive element of the second switch assembly are always electrically connected to each other. This still enables proper operation of the sensor assembly, while reducing the complexity of the signal lines required for monitoring, as will be explained, by way of example, by reference to FIGS. 3a to 3c.

In one embodiment, the sensor assembly is such that the first conductive element of the first switch assembly and the first conductive element of the second switch assembly are always electrically connected to each other. This still enables proper operation of the sensor assembly, while reducing the complexity of the signal lines required for monitoring, as will be explained, by way of example, by reference to FIGS. 5a to 5c and FIGS. 6a to 6c.

In one embodiment, the sensor assembly further includes a control unit configured for detecting at least whether the first and second conductive elements of the first switch assembly are in contact with each other or not, and whether the first and second conductive elements of the second switch assembly are in contact with each other or not, and outputting a signal indicating the result of the detecting step.

In one embodiment, the sensor assembly further includes a first layer and a second layer. The first layer is formed of a resilient material. In this embodiment, the following applies. The first conductive element of the first switch assembly is arranged on the second layer or on a spacer extending from the second layer. The second conductive element of the first switch assembly is arranged on the first layer or on a spacer extending from the first layer. The first conductive element of the second switch assembly is arranged on the second layer or on a spacer extending from the second layer. The second conductive element of the second switch assembly is arranged on the first layer or on a spacer extending from the first layer. When no force is exerted on the region of the surface, the distance between the first conductive element and second conductive element of the first switch assembly is smaller than the distance between the first conductive element and second conductive element of the second switch assembly.

The invention also relates to a display including a sensor assembly as described above. The invention also relates to a mobile terminal including such a display.

BRIEF DESCRIPTION OF THE DRAWINGS

Embodiments of the present invention shall now be described, in conjunction with the appended figures, in which:

FIGS. 7a to 7d schematically illustrate a cross-section of a sensor assembly including three switching assemblies at four stages of its operation, in one embodiment of the invention;

DESCRIPTION OF EMBODIMENTS

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1C:
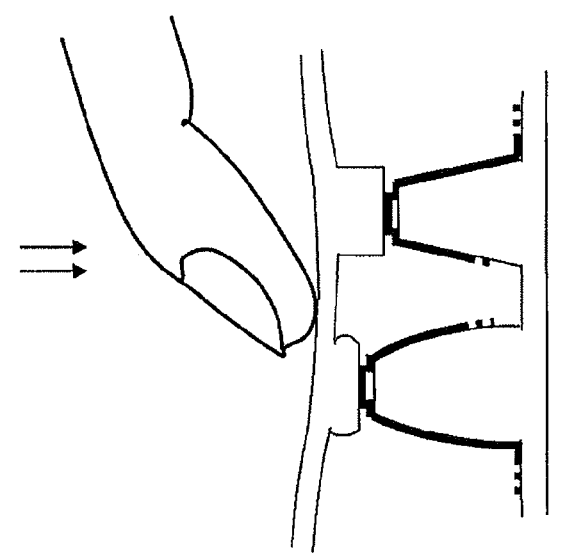
FIGS. 1a to 1c schematically illustrate a cross-section of a sensor assembly including two switching assemblies at three stages of its operation, in one embodiment of the invention.
Figure 1B:
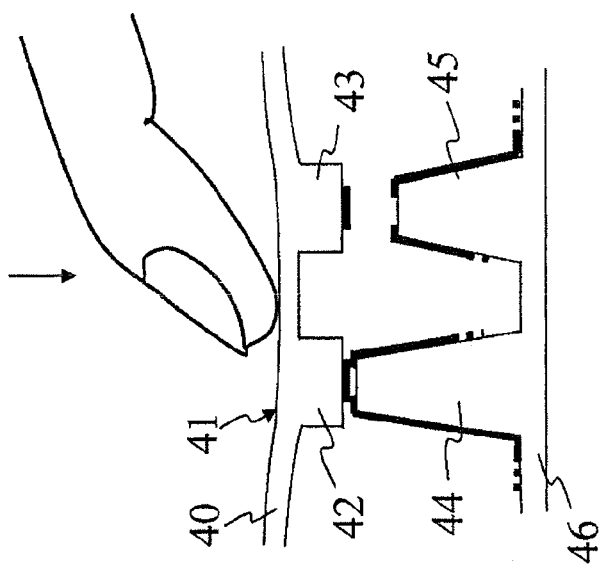
Figure 1A:
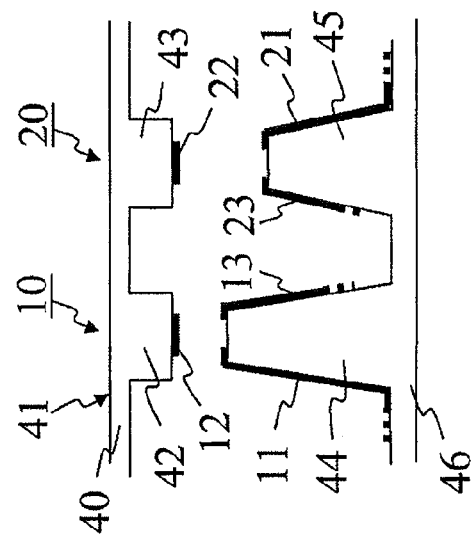

FIG. 1a schematically illustrates a sensor assembly in one embodiment of the invention. The sensor assembly includes a first layer 40 defining a front side surface 41, which is a coordinate input surface. The sensor assembly includes a second layer 46, separated from the first layer 40 by a gap. Pillars may however be formed between the two layers 40, 46 at some locations (not illustrated). The gap may be filled with liquid crystal, as used in liquid crystal displays, or with another fluid.

Two spacers, herein referred to as left upper spacer 42 and right upper spacer 43, are formed on the first layer 40 extending from the surface of the first layer 40 opposite to the front side surface 41. A conductive element, herein referred to as left second conductive element 12, is formed on the bottom surface of the left upper spacer 42. Another conductive element, herein referred to as right second conductive element 22, is formed on the bottom surface of the right upper spacer 43. A cover sheet of plastic or glass (not illustrated) may form the upper part of the first layer 40. The cover sheet of plastic or glass may act as a protecting element.

The second layer 46 defines two spacers, herein referred to as left lower spacer 44 and right lower spacer 45, extending towards the first layer 40. Two conductive elements, herein referred to as left first conductive element 11 and left third conductive element 13, are formed on the left lower spacer 44 in such a manner that a gap is formed between the left first conductive element 11 and the left third conductive element 13 on the top surface of the left lower spacer 44. Two conductive elements, herein referred to as right first conductive element 21 and right third conductive element 23, are formed on the right lower spacer 45 in such a manner that a gap is formed between the right first conductive element 21 and the right third conductive element 23 on the top surface of the right lower spacer 45.

The dotted lines on FIG. 1a (as well as on FIGS. 1b-7d) schematically represent signal lines leading to a control unit (not illustrated). The signal lines may be formed along the direction of the cross-section illustrated in FIG. 1a or may be formed in any other directions. Contact holes through insulating layers may also be formed to lead the signal lines to the control unit (see for instance exemplary contact hole 71 on FIG. 3 of US 2008/0018613 A1).

The left upper spacer 42, the left second conductive element 12, the left lower spacer 44, the left first conductive element 11 and the left third conductive element 13 form the first switching assembly 10. The right upper spacer 43, the right second conductive element 22, the right lower spacer 45, the right first conductive element 21 and the right third conductive element 23 form the second switching assembly 20. Together the first switching assembly 10 and the second switching assembly 20 form a force measuring assembly, which is driven by a control unit or driving unit (not illustrated), configured for determining how many contacts are formed. In the state illustrated in FIG. 1a where no pressure is exerted on the front side surface 41, no contact is formed.

The first layer 40 may be formed of a resilient material. Thus, the sensor assembly may be used repetitively, wherein the same shape or substantially the same shape is recovered between each interaction.

When no force is exerted on the front side surface 41 or when a force smaller than a first threshold force is exerted thereon, the distance between the bottom surface of the left upper spacer 42, wherein the left second conductive element 12 is formed, and the top surface of the left lower spacer 44, wherein the gap between the left first conductive element 11 and the left third conductive element 13 is formed, is smaller than the distance between the bottom surface of the right upper spacer 43, wherein the right second conductive element 22 is formed, and the top surface of the right lower spacer 45, wherein the gap between the right first conductive element 21 and the right third conductive element 23 is formed.

In one embodiment, as illustrated on FIG. 1a, this is because the height of the left lower spacer 44 is larger than the height of the right lower spacer 45.

In another embodiment (not illustrated), this is because the distance between the front side surface 41 and the bottom surface of the left upper spacer 42 is larger than the distance between the front side surface 41 and the bottom surface of the right upper spacer 43.

In yet another embodiment (not illustrated), this is because the height of the left lower spacer 44 is larger than the height of the right lower spacer 45 and also because the distance between the front side surface 41 and the bottom surface of the left upper spacer 42 is larger than the distance between the front side surface 41 and the bottom surface of the right upper spacer 43.

In yet another embodiment (not illustrated), the distance between spacers 42 and 44 and the distance between spacers 43 and 45 are equal, but a pillar made of soft material is formed in the vicinity of spacers 43, 45. Thus, a gradual force applied on the front side surface 41 causes first the spacers 42, 44 to contact each other and then later the spacers 43, 45 to contact each other. More than one pillar may provide the same function. Such a pillar may also be called pillar spacer.

Let us now turn to FIG. 1b, where a finger is illustrated exerting a pressure on the front side surface 41. The size of the depicted finger should by no means be construed as implying any specific dimension of the layers and switch assemblies depicted under the finger. The depicted finger is only illustrative of the force exerted on the front side surface 41, wherein the force may be exerted not only by a finger, but also by a hand, a stylus or another object. The thickness of the two layers 40, 46, the heights of the spacers 42, 43, 44, 45 and the size of the gap between the spacers may be degrees of magnitude smaller than the size of a human finger. This also applies to FIGS. 1c, 2b, 2c, 3b, 3c, 4b, 4c, 5b, 5c, 6b and 6c. In one embodiment, the distance between the front side surface 41 and the bottom of the second layer 46 is smaller than 0.1 mm.

When a force is exerted on the front side surface 41 and when this force is comprised between a first force threshold and a second force threshold, this range of force being symbolically illustrated by the single downward arrow on FIG. 1b (mild pressure exerted on the front side surface 41), the left upper spacer 42 is caused to move downwards and to come in contact with the left lower spacer 44. As a result, the left second conductive element 12 comes into contact with both the left first conductive element 11 and the left third conductive element 13. An electric contact is therefore formed between the left first conductive element 11 and the left third conductive element 13 through the left second conductive element 12. This electric path can be detected, so that the range of exerted force can also be detected.

Still in the state illustrated in FIG. 1b, the right upper spacer 43 is caused to move downwards but does not come in contact with the right lower spacer 45, because the gap between the right upper spacer 43 and the right lower spacer 45 is larger than the gap between the left upper spacer 42 and the left lower spacer 44. No electric contact is formed at that stage between the right first conductive element 21 and the right third conductive element 23. This absence of electric path can be detected.

Now turning to FIG. 1c, when a force is exerted on the front side surface 41 and when this force is larger than the second force threshold, this range of force being symbolically illustrated by the double downward arrow (strong pressure exerted on the front side surface 41), the right upper spacer 43 is caused to move further downwards and to come in contact with the right lower spacer 45. As a result, the right second conductive element 22 comes into contact with both the right first conductive element 21 and the right third conductive element 23. An electric contact is therefore formed between the right first conductive element 21 and the right third conductive element 23, in addition to the already formed electric contact between the left first conductive element 11 and the left third conductive element 13. Both electric contacts can be detected, and it can be detected that the exerted force is larger than the second threshold.

As shown on FIG. 1c, the spacers may be made of soft material (such as for instance silicone rubber), so that the pressure exerted on the first layer 40 when the left upper spacer 42 and the left lower spacer 44 are already in contact with each other can be absorbed by a deformation of the spacers 42, 44.

Thus, the right upper spacer 43 and the right lower spacer 45 can continue to be brought close to each other until their contact. Different softness characteristics for different spacers are possible. The softness, in combination with the respective dimensions of the spacers, may then determine the force required to activate each new level.

In one embodiment, the conductive elements 11, 12, 13, 21, 22, 23 are made of indium tin oxide (ITO) or of another transparent conductive material. The voltage (i.e., electric potential difference) applied to two conductive elements may for instance have a value around 1 or 2 V (Volts), and the current flowing when a contact is formed between two conductive elements may for instance be around the 10 μA (10 microampere).

The design of the control unit (not illustrated) and the interfacing may for instance be based on the design principles of the interfacing technology described in Bonnie C. Baker, Wendy Fang, "*Powering resistive touch screens efficiently*", Planet Analog, Mai 28, 2007 (3:16 PM), URL: http://www-.planetanalog.com/showArticle?articleID=199702778 (the first half of the article appeared in print in Planet Analog Magazine, May 28, 2007). The embodiments of the invention are however based on a touch sensing solution using microswitch assemblies, not on a resistive touch sensing solution (although some embodiments of the invention may be combined therewith).

A signal output (not illustrated) of the control unit representing the number of formed contacts may be converted to a signal representing an estimated force. Depending on whether a force is exerted on the front side surface 41 and depending on the intensity of the force exerted on the front side surface 41, different actions may be triggered in the control logic of a user interface. For instance, if the measured force exceeds the first threshold force, a first action is carried out. If the measured force exceeds the second threshold force, a second action is carried out.

Figure 2C:
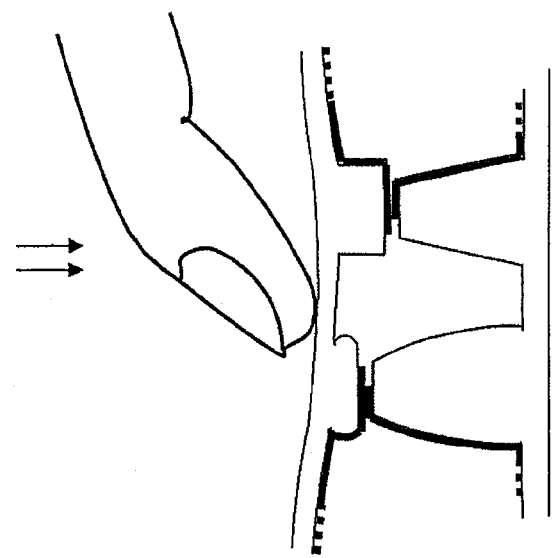
FIGS. 2a to 2c schematically illustrate a cross-section of a sensor assembly at three stages of its operation, in one embodiment of the invention, wherein the sensor assembly differs from the sensor assembly illustrated in FIGS. 1a to 1c by the arrangement of the conductive elements.
Figure 2B:
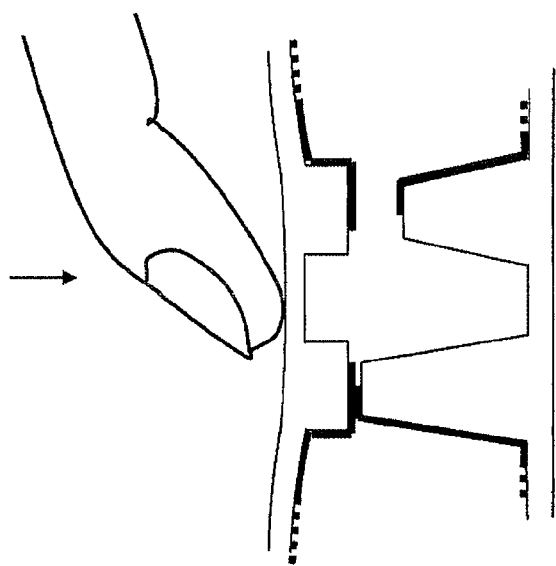
Figure 2A:
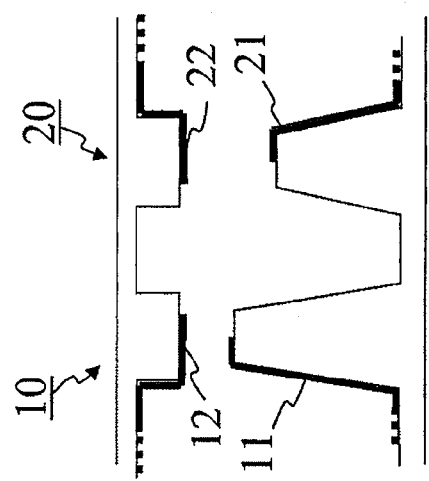

FIGS. 2a to 2c schematically illustrate a cross-section of a sensor assembly at three stages of its operation, in one embodiment of the invention. The sensor assembly illustrated in FIG. 2a differs from the sensor assembly illustrated in FIG. 1a in that, in FIG. 2a, the left second conductive element 12 is connected to a signal line (symbolically illustrated by the dotted line in the upper left region of FIG. 2a), and the right second conductive element 22 is also connected to a signal line (symbolically illustrated by the dotted line in the upper right region of FIG. 2a). The signal lines lead to a control unit (not illustrated). There are no left third conductive element 13 and no right third conductive element 23 in the sensor assembly of FIG. 2a.

When a pressure is applied on the front side surface 41, as illustrated in FIG. 2b, the left second conductive element 12 is caused to move downwards and to contact the left first conductive element 11. This contact may be detected, since an electric current can flow, in that state, between the left second conductive element 12 and the left first conductive element 11.

When a stronger pressure is exerted on the front side surface 41, as illustrated in FIG. 2c, a contact is made between the right second conductive element 22 and the right first conductive element 21. This contact can also be detected.

Figure 3C:
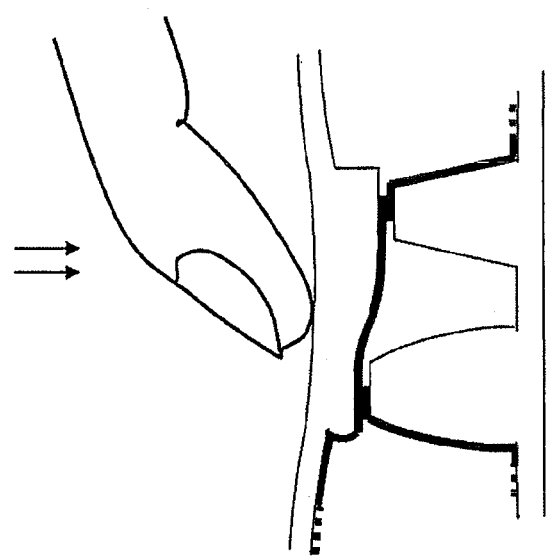
FIGS. 3a to 3c schematically illustrate a cross-section of a sensor assembly at three stages of its operation, in one embodiment of the invention, wherein the sensor assembly differs from the sensor assemblies illustrated in FIGS. 1a to 2c by the arrangement of the conductive elements and spacers.
Figure 3B:
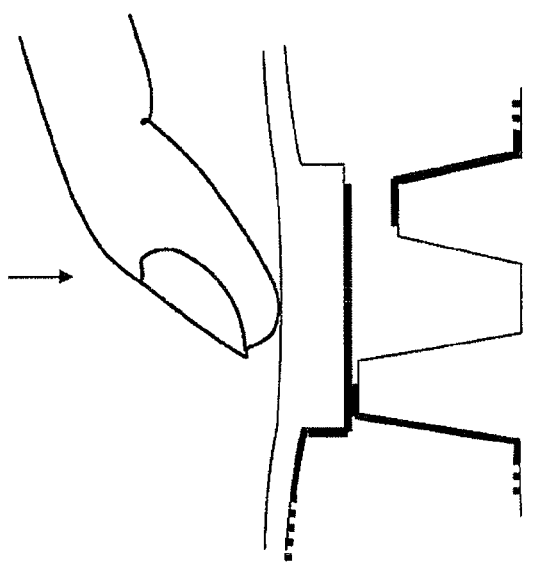
Figure 3A:
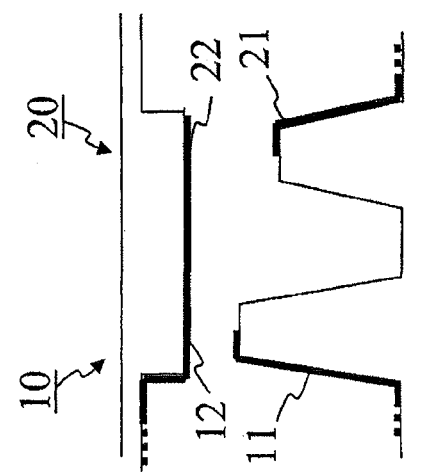

FIGS. 3a to 3c schematically illustrate a cross-section of a sensor assembly in another embodiment of the invention. As shown in FIG. 3a, the left second conductive element 12 and the right second conductive element 22 form a single conductive element connected to a signal line (symbolically illustrated by the dotted line in the upper left region of FIG. 3a). There are therefore fewer signal lines to be arranged for detection purposes.

Figure 4C:
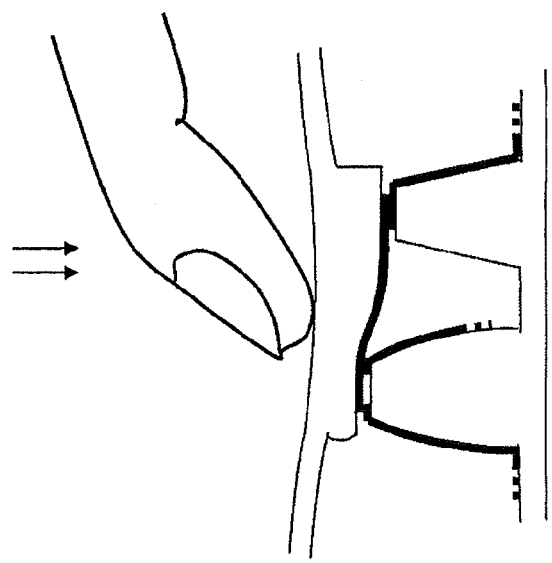
FIGS. 4a to 6c schematically illustrate cross-section of further sensor assemblies in embodiments of the invention.
Figure 4B:
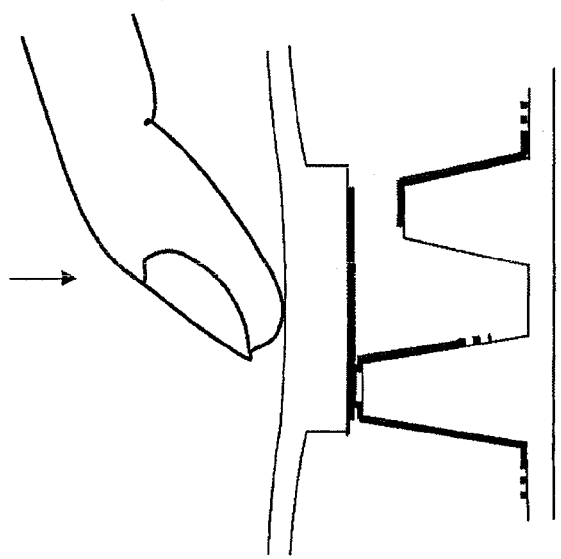
Figure 4A:
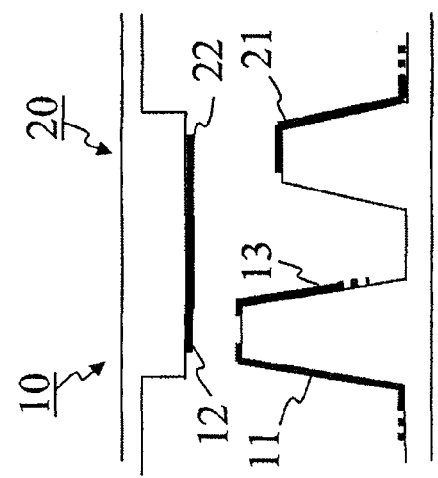

FIGS. 4a to 4c schematically illustrate a sensor assembly in another embodiment of the invention. It works as follows. If an electric contact is made between the left first conductive element 11 and the left third conductive element 13 through the left second conductive element 12, this means that the force exerted on the front side surface 41 is larger than the first threshold force. If an electric contact is formed between the left first conductive element 11 and the right first conductive element 21 through the right second conductive element 22 and the left second conductive element 12 (which are permanently connected to each other), this means that the force exerted on the front side surface 41 is larger than the second threshold. In this embodiment, there are therefore also fewer signal lines to be arranged for detection purposes.

Figure 5C:
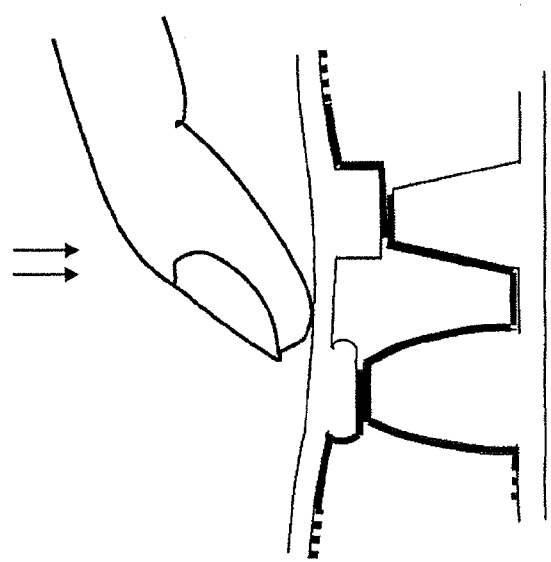
Figure 5B:
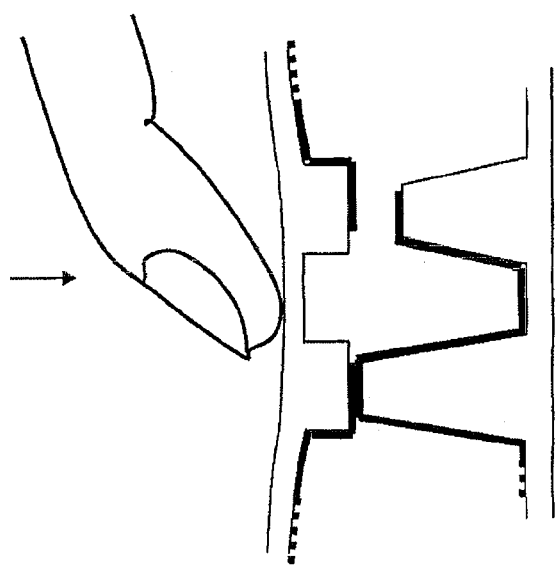
Figure 5A:
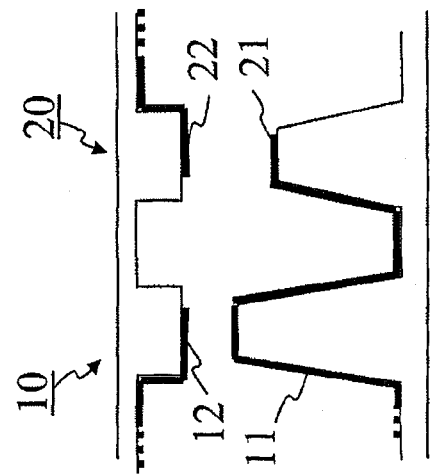

FIGS. 5a to 5c schematically illustrate a sensor assembly in another embodiment of the invention. As illustrated in FIG. 5a, the left first conductive element 11 and the right first conductive element 21 are permanently connected to each other. If an electric contact is made between the left first conductive element 11 and the left second conductive element 12, this means that the force exerted on the front side surface 41 is larger than the first threshold. If an electric contact is made between the right first conductive element 21 (permanently connected to the left first conductive element 11) and the right second conductive element 22, this means that the force exerted on the front side surface 41 is larger than the second threshold.

Figure 6C:
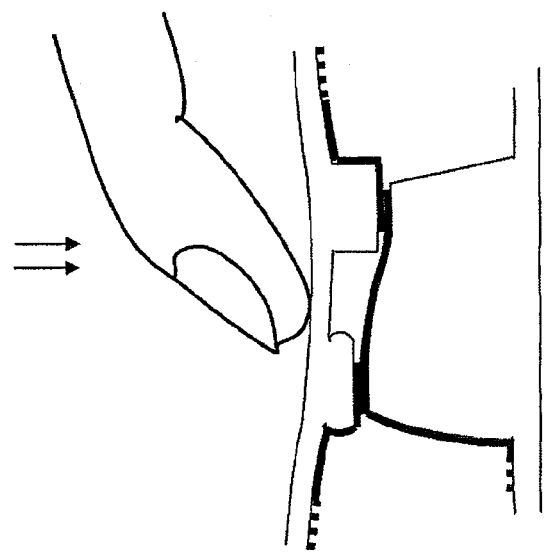
Figure 6B:
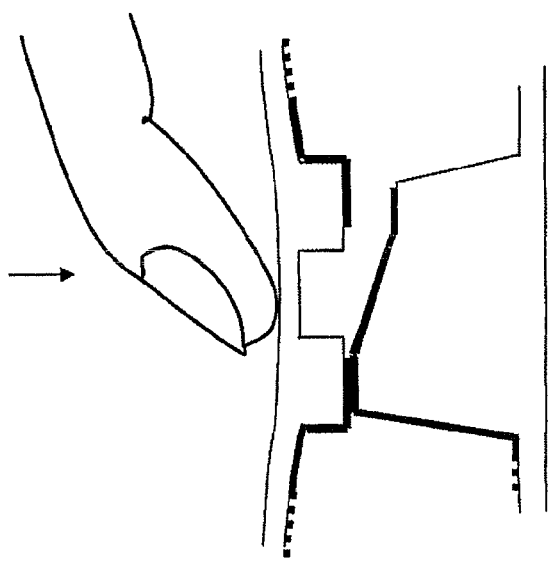
Figure 6A:
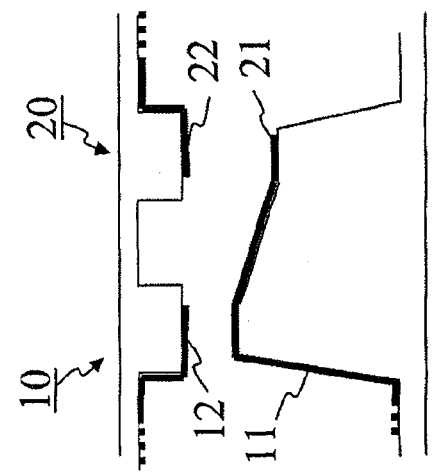

FIGS. 6a to 6c schematically illustrate a variant of the sensor assembly illustrated in FIGS. 5a to 5c. In FIGS. 6a to 6c, the left lower spacer 44 and the right lower spacer 45 form a single spacer having a profile such that the single lower spacer on the side of the left upper spacer 42 is higher than on the side of the right upper spacer 43.

Besides the embodiments illustrated in FIGS. 1a to 6c, other embodiments are contemplated by notably varying the position of the conductive elements and the shape of the spacers. These embodiments are within the scope of the invention. In addition, the number of contacts that can be made and which each correspond to a particular force threshold may be more than two. This is schematically illustrated in FIGS. 7a to 7d showing three pairs of spacers forming three switching assemblies 10, 20, 30.

When the force exerted on the front side surface 41 is smaller than a first threshold, no contact is made (FIG. 7a). When the applied force is comprised between the first threshold force and a second threshold force, one contact is made (FIG. 7b, contact between conductive elements 11 and 12). When the applied force is larger than the second threshold force but smaller than a third threshold force, two contacts are made (FIG. 7c, contacts between conductive elements 11 and 12 and between conductive elements 21 and 22). Finally, when the applied force is larger than the third threshold force, three contacts are made (FIG. 7d, contacts between conductive elements 11 and 12, between conductive elements 21 and 22, and between conductive elements 31 and 32).

Figure 8:
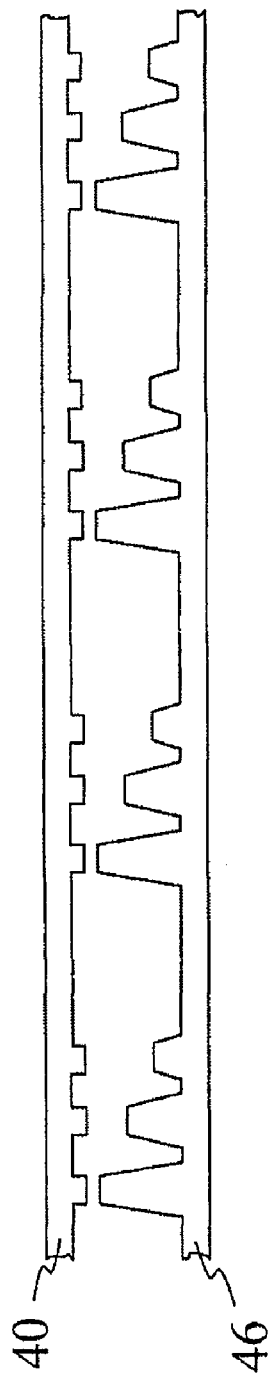
FIG. 8 schematically illustrates a cross-section of a sensor assembly including a plurality of groups of three switching assemblies, in one embodiment of the invention.

FIG. 8 schematically illustrates a sensor assembly wherein several force measurements can be made in different portions of a display or more generally coordinate input surface, in one embodiment of the invention. Switch assemblies may be arranged in a distributed manner under substantially all regions of the coordinate input surface. The coordinate input surface may be the surface of a display or a touchpad for instance (this applies to all embodiments).

Figure 9:
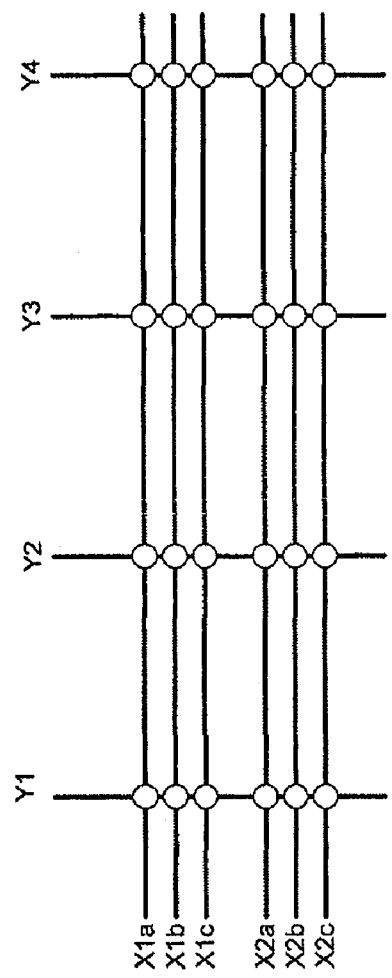
FIG. 9 schematically illustrates signal lines in one embodiment of the invention.

FIG. 9 schematically illustrates how signal lines for a sensor assembly may be implemented, in one embodiment of the invention. Signal lines X1*a*, X1*b*, X1*c*, and X2*a*, X2*b*, X2*c* may be located on the bottom layer (second layer 46), while the signal lines Y1, Y2, Y3, Y4 may be located on the upper layer (first layer 40). The signal lines are made, in one embodiment, of indium tin oxide (ITO).

The sensor assembly may further comprise, in addition to the force measuring units made of switch assemblies, capacitance measuring units (not illustrated) for measuring a capacitance between the first layer 40 and its surrounding environment. The surrounding environment may include a finger, hand or other object, which may modify the capacitance measured by the capacitance measuring unit, when active.

In one embodiment, the sensor assembly is such that a capacitance measuring unit is configured to detect the presence of a finger, hand, stylus or other object on the front side surface 41 or in the vicinity thereof; and the at least one force measuring unit is configured to detect whether a force is exerted by the finger, hand, stylus or other object on the front side surface 41.

Therefore, more parameters may be used to control a device through a user interface. Whether a finger, hand, stylus or other object is merely present on the front side surface 41 or in the vicinity thereof or whether the finger, hand, stylus or other object is exerting a force can therefore be used as an input parameter of the user interface. In one embodiment, detecting whether a force is exerted by the finger, hand, stylus or other object on the front side surface 41 means detecting that a force larger than first threshold value is exerted by the finger, hand, stylus or other object on the front side surface 41.

In one embodiment, the at least one capacitance measuring unit is configured to detect the presence of a finger, hand or other object on the front side surface 41 or in the vicinity thereof; and the force measuring unit, including the first and second assemblies 10, 20, is configured to estimate the force exerted by the finger, hand, stylus or other object on the front side surface 41. Therefore, yet more parameters may be used to control a device through a user interface. Namely the value of the force exerted by the finger, hand, stylus or other object on the front side surface 41 of the sensor assembly may also be used as an input parameter of the user interface.

In one embodiment, the force measuring unit, including at least the first and second assemblies 10, 20 and the control unit, is activated only when the capacitance measuring unit indicates a change of capacitance exceeding a threshold value. This saves power by not permanently activating the force measuring unit. The force measurement unit does not need to start until a signal from the capacitance measurement unit has indicated the presence of a user's finger, hand, stylus or other object.

The sensor assembly is, in one embodiment, transparent. Thus, the presence of a finger, hand, stylus or other object on the front side surface 41 can be detected; the position of the finger, hand, stylus or other object on the front side surface 41 can be estimated; and the force exerted by the finger, hand, stylus or other object on the front side surface 41 can be also estimated.

The invention also relates to a method of using a sensor assembly as described above, the method including steps of outputting a signal indicating the presence of a finger, hand, stylus or other object on the front side surface 41 or in the vicinity thereof; and outputting a signal indicating whether a force is exerted by the finger, hand, stylus or other object on the front side surface 41.

The invention also relates to a method of using a sensor assembly as described above, the method including steps of outputting a signal indicating the presence of a finger, hand, stylus or other object on the front side surface 41 or in the vicinity thereof; outputting a signal indicating the force is exerted by the finger, hand, stylus or other object on the front side surface 41; and outputting a signal indicating an estimation of the two-dimensional position of the finger, hand, stylus or other object on the front side surface 41.

In one embodiment, the method further includes outputting a signal indicating an estimation of the three-dimensional position of the finger, hand, stylus or other object on the front side surface 41, based on the signal indicating an estimation of the two-dimensional position of the finger, hand, stylus or other object on the front side surface 41, which provides coordinates x and y; and the signal indicating an estimation of the force exerted by the finger, hand, stylus or other object on the front side surface 41, which provides coordinate z; wherein coordinates x and y correspond to two distinct directions along the front side surface 41 and coordinate z corresponds a direction perpendicular to the front side surface 41.

The physical entities according to the invention and/or its embodiments, including the controlling unit, the force measuring unit and the capacitance measuring unit, may comprise or store computer programs including instructions such that, when the computer programs are executed on the physical entities, steps, procedures and functions of these units are carried out according to embodiments of the invention. The invention also relates to such computer programs for carrying out the function of the units, and to any computer-readable medium storing the computer programs for carrying out methods according to the invention.

Where the terms "control unit", "force measuring unit" and "capacitance measuring unit" are used herein, no restriction is made regarding how distributed the elements of these units may be and regarding how gathered these elements may be. That is, the constituent elements of the above units may be distributed in different software or hardware components or devices for bringing about the intended function. A plurality of distinct elements or units may also be gathered for providing the intended functionalities.

Any one of the above-referred units may be implemented in hardware, software, field-programmable gate array (FPGA), application-specific integrated circuit (ASICs), firmware or the like.

In further embodiments of the invention, the control unit, the force measuring unit and the capacitance measuring unit are respectively replaced by controlling means, force measuring means and capacitance measuring means, or by a controller, a force measurer and a capacitance measurer, for performing the functions of the control unit, force measuring unit and capacitance measuring unit respectively.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of examples, the examples only serve to provide the skilled person with a better understanding, and are not intended to limit the scope of the invention. The scope of the invention is much rather defined by the appended claims.

The invention claimed is:

1. Sensor assembly including a coordinate input surface and, under a region of the surface,
    at least a first switch assembly and a second switch assembly, each including at least a first conductive element and a second conductive element, the second conductive element being movable relative to the first conductive element;
    the first and second switch assemblies and their respective first and second conductive elements being arranged so that:
    when no force is exerted on the region of the surface or when a force smaller than a first threshold force is exerted thereon, the first and second conductive elements of the first switch assembly are not in contact with each other and the first and second conductive elements of the second switch assembly are not in contact with each other;
    when a force larger than the first threshold force and smaller than a second threshold force is exerted on the region, the first and second conductive elements of the first switch assembly are in contact with each other and the first and second conductive elements of the second switch assembly are not in contact with each other; and
    when a force larger than the second threshold force is exerted on the region, the first and second conductive elements of the first switch assembly are in contact with each other and the first and second conductive elements of the second switch assembly are in contact with each other.

2. Sensor assembly of claim 1, wherein the coordinate input surface is the surface of a touch screen.

3. Sensor assembly of claim 1, wherein the second conductive element of the first switch assembly and the second conductive element of the second switch assembly are always electrically connected to each other.

4. Sensor assembly of claim 1, wherein the first conductive element of the first switch assembly and the first conductive element of the second switch assembly are always electrically connected to each other.

5. Sensor assembly according to claim 1, further including a control unit configured for detecting at least
- whether the first and second conductive elements of the first switch assembly are in contact with each other or not, and
- whether the first and second conductive elements of the second switch assembly are in contact with each other or not, and
- outputting a signal indicating the result of the detecting step.

6. Sensor assembly according to claim 1, further including a first layer and a second layer, the first layer being formed of a resilient material, wherein
- the first conductive element of the first switch assembly is arranged on the second layer or on a spacer extending from the second layer;
- the second conductive element of the first switch assembly is arranged on the first layer or on a spacer extending from the first layer;
- the first conductive element of the second switch assembly is arranged on the second layer or on a spacer extending from the second layer;
- the second conductive element of the second switch assembly is arranged on the first layer or on a spacer extending from the first layer;
- when no force is exerted on the region of the surface, the distance between the first conductive element and second conductive element of the first switch assembly is smaller than the distance between the first conductive element and second conductive element of the second switch assembly.

7. Display including a sensor assembly according to claim 1.

8. Mobile terminal including a display of claim 7.

* * * * *